US008536831B2

(12) United States Patent
Kanno

(10) Patent No.: US 8,536,831 B2
(45) Date of Patent: Sep. 17, 2013

(54) ELECTRIC POWER SUPPLY SYSTEM FOR VEHICLE INCLUDING A POWER RECEIVING ANTENNA

(75) Inventor: Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/944,015

(22) Filed: Nov. 11, 2010

(65) Prior Publication Data

US 2011/0114400 A1    May 19, 2011

Related U.S. Application Data

(60) Provisional application No. 61/260,926, filed on Nov. 13, 2009.

(51) Int. Cl.
*H02J 7/00*    (2006.01)
(52) U.S. Cl.
USPC ............................................ 320/109; 320/108
(58) Field of Classification Search
USPC ................................................ 320/109
See application file for complete search history.

(56) References Cited

U.S. PATENT DOCUMENTS

| | | | | |
|---|---|---|---|---|
| 5,573,090 | A * | 11/1996 | Ross ............................... | 191/10 |
| 5,710,502 | A * | 1/1998 | Poumey .......................... | 320/108 |
| 5,821,728 | A | 10/1998 | Schwind ......................... | 320/108 |
| 2001/0015299 | A1* | 8/2001 | Moore ............................ | 180/243 |
| 2003/0030411 | A1* | 2/2003 | Ayano et al. .................... | 320/109 |
| 2003/0090424 | A1* | 5/2003 | Brune et al. .................... | 343/741 |
| 2003/0098756 | A1* | 5/2003 | Ohashi et al. ................... | 333/133 |
| 2008/0048917 | A1* | 2/2008 | Achour et al. .................. | 343/700 MS |
| 2008/0265684 | A1 | 10/2008 | Farkas | |
| 2008/0278264 | A1 | 11/2008 | Karalis et al. | |
| 2010/0225271 | A1 | 9/2010 | Oyobe et al. | |
| 2010/0295506 | A1* | 11/2010 | Ichikawa ......................... | 320/108 |

FOREIGN PATENT DOCUMENTS

| | | |
|---|---|---|
| EP | 0 289 868 | 11/1988 |
| JP | 2002-152996 | 5/2002 |
| JP | 2009-106136 | 5/2006 |
| WO | 98/50993 | 11/1998 |
| WO | 2006/127185 A2 | 11/2006 |
| WO | 2009/042214 A1 | 4/2009 |

OTHER PUBLICATIONS

International Search Report and the Written Opinion for corresponding International Application No. PCT/JP2010/070520 mailed Mar. 1, 2011.

* cited by examiner

*Primary Examiner* — Arun Williams
(74) *Attorney, Agent, or Firm* — Renner, Otto, Boisselle & Sklar, LLP

(57) ABSTRACT

To stabilize the transmission characteristic of an electric power supply system for vehicle even when the vehicle being charged and powered by it shifts horizontally, a power transmitting antenna, which is arranged on the ground, and a power receiving antenna, which is arranged at the bottom of the vehicle, set up resonances at substantially the same resonant frequency and produce magnetic resonant coupling between them. When the power receiving antenna enters the zone in which the power transmitting antenna is located, power is transmitted to the vehicle. By setting the width of the power receiving antenna as measured in the vehicle's width direction to be larger than the length of the power receiving antenna as measured in the vehicle's traveling direction, the transmission characteristic can be stabilized.

19 Claims, 7 Drawing Sheets

ELECTRIC POWER SUPPLY SYSTEM FOR VEHICLE INCLUDING A POWER RECEIVING ANTENNA

This application claims priority under 35 USC §119(e) to U.S. Provisional Application No. 61/260,926 filed on Nov. 13, 2009, the entire contents of which are incorporated herein by reference.

BACKGROUND OF THE INVENTION

1. Field of the Invention

The present invention relates to an electric power supply system for supplying energy to a vehicle from outside of it by a non-contact method.

2. Description of the Related Art

As an increasing number of people have been paying more and more attention to environmental issues these days, there have been growing expectations for electric vehicles to be driven with batteries and electric motors. Such an electric vehicle can naturally be charged and powered via cable connection. But people have been researching and developing wireless charging and powering techniques that adopt a non-contact method. Meanwhile, considering the overall weight and cost of batteries, there is definitely a limit to the overall capacity of batteries that can be loaded into a single vehicle. And that limit to the overall capacity of batteries directly leads to the maximum mileage a vehicle can do per charging. That is why there is an increasing demand for developing an effective technique for charging and powering a running vehicle.

As a wireless power transmission technique, a resonant magnetic coupling method was proposed in United States Patent Application Publication No. 2008/0278264-A1 (see its description and FIGS. 6 and 11, among other things). According to such a method, resonant mode coupling between resonator antennas is used, and therefore, power can be transmitted more efficiently over a longer distance than conventional electromagnetic induction methods. Among other things, since a resonant magnetic field is used according to such a method, influence on surrounding organisms would be much less than a situation where a resonant electric field is used.

The wireless power transmission technique by resonant magnetic coupling can increase the transmission distance by leaps and bounds compared to the conventional electromagnetic induction method. Specifically, if the coupling coefficient k indicating the degree of coupling between resonant antennas is greater than the square root of the product of the attenuation constants $\Gamma 1$ and $\Gamma 2$ of the respective antennas, energy can be transferred efficiently. A wireless power transmission system that uses the resonant magnetic coupling uses a resonant circuit that has a coupling coefficient k of less than one but has a high Q factor indicating that the resonance will produce low loss, and therefore, can be regarded as an electromagnetic induction system with increased transmission efficiency. However, since the resonant magnetic coupling method requires that $k \neq 1$ unlike the electromagnetic induction method in which $k \approx 1$, power cannot be transmitted with high efficiency unless inter-block impedance matching is kept achieved between the oscillation section and the power transmitting antenna and between the rectification section and the power receiving antenna.

Japanese Patent Application Laid-Open Publication No. 2009-106136 discloses an example in which the technique of United States Patent Application Publication No. 2008/0278264-A1 is used to charge and power a vehicle. According to this patent document, while a parked vehicle is being charged and powered, the relative gap between a power transmitting antenna, which is installed on the ground, and a power receiving antenna, which is arranged on or in the vehicle, can be filled by arranging multiple sets of power transmitting and receiving antennas.

On the other hand, United States Patent Application Publication No. 2008/0265684-A1 discloses a system for transferring power to a vehicle by electromagnetic induction. This patent document teaches how to cope with horizontal parking position shift of a vehicle being parked and charged. That system provides two power receiving antennas and two power transmitting antennas and controls their amplitudes and phases independently of each other, thereby dealing with such a positional shift.

In both of the system for charging and powering a running vehicle and the system for charging and powering a parked vehicle, the stability of transmission could be lost due to a relative positional shift between the power transmitting and receiving antennas. The present inventors point out this problem and provide means for overcoming it.

Specifically, in the system for charging and powering a vehicle by resonant magnetic coupling, if the relative position of the power receiving antenna in a running or parked vehicle to the power transmitting antenna shifts horizontally with respect to the traveling direction of the vehicle, the power transmission by resonant magnetic coupling would lose its stability.

Particularly, as far as running vehicles are concerned, most vehicles will run along approximately the center of a traffic lane but quite a few vehicles will also run along either end of the traffic lane. That is why the relative horizontal positional shift of a running vehicle would be greater that of a parked vehicle. United States Patent Application Publication No. 2008/0265684-A1 provides means for coping with the loss of stability of the transmission performance due to relative horizontal positional shifts between the power transmitting antenna and the power receiving antenna of a parked vehicle with respect to the traveling direction of the vehicle. According to the technique disclosed in that patent document, however, the number of antennas to provide should be increased, thus raising the cost significantly. On top of that, since charging and powering should not be done efficiently that way, it is difficult to apply such a technique to a system for charging and powering a running vehicle.

Likewise, even in a system for charging and powering a parked vehicle, there will also be relative horizontal positional shifts with respect to the running direction of the vehicle. If the driver should have such high driving skills as to park his or her vehicle exactly where it is supposed to be, then there would be no horizontal shift at all. However, if such an unrealistic restriction were imposed, the advantage to be achieved by adopting such a non-contact charging and powering system would be sacrificed. For that reason, even for the system for charging and powering a parked vehicle, a scheme for ensuring stabilized performance in cases of horizontal shifts should also be provided. Nevertheless, Japanese Patent Application Laid-Open Publication No. 2009-106136 does not mention what problems will arise when a system for charging and powering a running or parked vehicle is established and provides no means for overcoming such problems.

It is therefore an object of the present invention to provide an electric power supply system for vehicle that can charge and power a running or parked vehicle while achieving stabilized performance even when the vehicle shifts horizontally with respect to its traveling direction.

SUMMARY OF THE INVENTION

An electric power supply system for vehicle according to the present invention includes at least one power transmitting antenna, which is arranged on or under the ground, and a power receiving antenna, which is arranged in or on at least one vehicle. The power transmitting and receiving antennas form a pair of resonators that couples with each other by producing resonant magnetic coupling between them. Supposing that the direction in which the vehicle is traveling is Y direction and the direction perpendicular to the Y direction is X direction, the lengths of the power transmitting antenna as measured in the Y and X directions are greater than those of the power receiving antenna as measured in the Y and X directions, respectively. The length of the power receiving antenna as measured in the X direction is greater than its length as measured in the Y direction. Power is supplied from the power transmitting antenna to the power receiving antenna by a non-contact method when the power transmitting antenna faces the power receiving antenna.

A vehicle according to the present invention is designed to be used in the electric power supply system for vehicle of the present invention and includes the power receiving antenna and a load to be energized with the energy that the power receiving antenna has received from the power transmitting antenna.

A power transmitting antenna according to the present invention is designed to be used in an electric power supply system for vehicle according to any of the preferred embodiments of the present invention described above.

A power receiving system according to the present invention includes: a power receiving antenna for use in an electric power supply system for vehicle according to any of the preferred embodiments of the present invention described above; and a power converting section for converting RF energy that the power receiving antenna has received from the power transmitting antenna into DC energy or AC energy, of which the frequency is lower than that of the RF energy, and outputting the DC energy or the AC energy.

An electric power supply system for vehicle according to the present invention can get charging and powering done with good stability even if the vehicle's position has shifted significantly and even though the system has a simple configuration. As a result, a lighter system can be provided at a reduced cost. On top of that, the electric power supply system for vehicle of the present invention with such stabilized charging and powering capabilities can also simply the circuit configuration by omitting some circuit blocks such as DC/DC converter and a regulator. Consequently, the overall powering efficiency will improve and charging and powering can be done in a shorter time.

DETAILED DESCRIPTION OF PREFERRED EMBODIMENTS

Figure 1A:
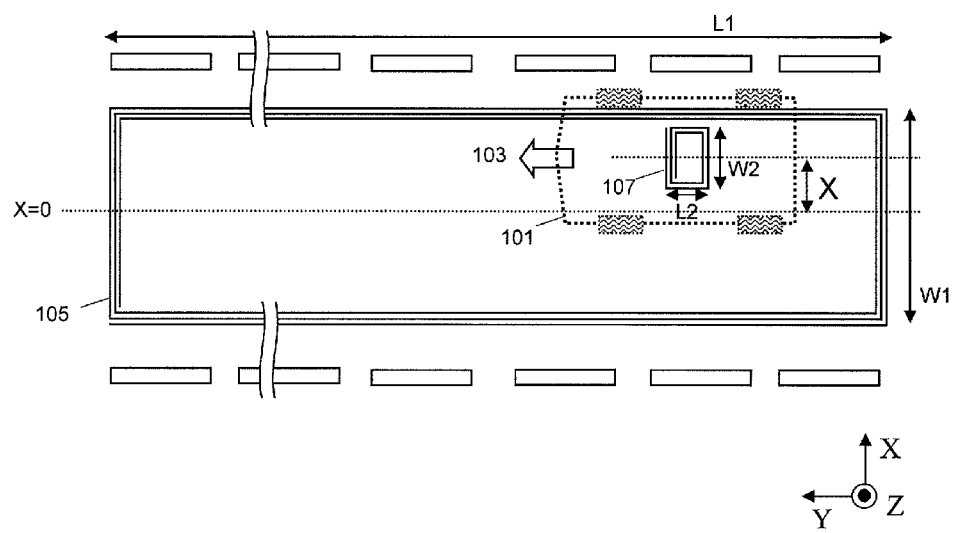
FIGS. 1A and 1B are schematic representations respectively illustrating a perspective top view and a side view of an electric power supply system for vehicle as a first preferred embodiment of the present invention.

An electric power supply system for vehicle according to a preferred embodiment of the present invention charges and powers a vehicle wirelessly by producing resonant magnetic coupling between resonant antennas using mostly components that are proximate to the magnetic field. Hereinafter, preferred embodiments of the present invention will be described with reference to the accompanying drawings. In the following description, any pair of components shown in multiple drawings and having substantially the same function will be identified by the same reference numeral.

Embodiment 1

An Electric Power Supply System for Vehicle as a first specific preferred embodiment of the present invention is used as either an electric power supply system for the running vehicle for charging and/or powering a running vehicle or an electric power supply system for the parked vehicle for charging and/or powering a parked vehicle. As used herein, "to supply power" means "to charge" or "to power". "To charge" means charging a secondary battery that is put in a vehicle and storing power to drive the vehicle, while "to power" means feeding electric power to a load (such as a driving electric motor) that is also built in the vehicle. An electric power supply system for vehicle according to this first preferred embodiment of the present invention includes a power transmitting antenna, which is provided on or under the ground, and a power receiving antenna, which is provided for the vehicle. These power transmitting and receiving antennas produce resonant magnetic coupling, thereby transmitting power wirelessly.

Figure 1B:
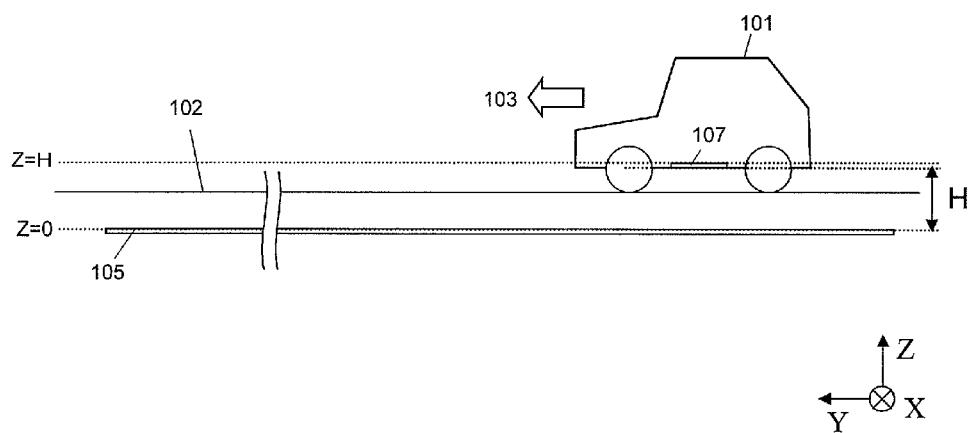

FIG. 1A is a schematic representation illustrating an electric power supply system for vehicle according to a first preferred embodiment of the present invention as viewed in perspective from over the system, and FIG. 1B is a schematic side view of the system shown in FIG. 1A. In the following description, the XYZ coordinate system shown in FIG. 1A will be used for illustrative purposes. Specifically, the direction 103 in which a vehicle 101 is traveling and its opposite direction will be referred to herein as "±Y directions", the horizontal directions that intersect with the traveling direction 103 of the vehicle 101 at right angles as "±X directions", and the perpendicular directions of the vehicle 101 as "±Z directions", respectively. Unless otherwise stated, the power transmitting antenna 105 is supposed to have a rectangular inductor that is arranged on the XY plane. The center of mass of the power transmitting antenna 105 is supposed to be the origin of the coordinate system (i.e., where X=Y=Z=0) and the power transmitting antenna 105 is supposed to be fixed. Likewise, the power receiving antenna 107 is also supposed to have a rectangular inductor that is arranged parallel to the XY plane. The sizes of the power transmitting antenna 105 as measured in the X and Y directions will be identified herein by W1 and L1, respectively. In the same way, the sizes of the power receiving antenna 107 as measured in the X and Y directions will be identified herein by W2 and L2, respectively. In this description, the size of an antenna as measured in the X or Y direction means the length of the antenna as measured in that direction. Also, as shown in FIG. 1B, the Z coordinate H of the plane on which the power receiving antenna 107 is arranged corresponds to the height of the power receiving antenna's arrangement plane with respect to the plane on which the power transmitting antenna 105 is arranged.

As will be described later, those sizes W1 and L1 of the power transmitting antenna 105 as measured in the X and Y directions are defined to be greater than the sizes W2 and L2 of the power receiving antenna 107 as measured in the X and Y directions. That is why the area of the power transmitting antenna 105 is defined to be larger than that of the power receiving antenna 107. Furthermore, to stabilize the transmission characteristic even if the vehicle 101 shifts in the X direction, the size W2 of the power receiving antenna 107 as measured in the X direction is defined to be greater than its size L2 as measured in the Y direction as will also be described later.

No matter whether this electric power supply system for vehicle is used for a running vehicle or a parked vehicle, the power transmitting antenna 105 preferably has a shape that is elongated in the Y direction. Particularly in the electric power supply system for the running vehicle, the area of the power transmitting antenna 105 is preferably defined to be much larger than that of the power receiving antenna 107. It is preferred that the center of mass of the power receiving antenna 107 and that of the vehicle 101 itself have the same XY coordinates. However, the effects of the present invention can be achieved even if their XY coordinates are different from each other.

Figure 2A:
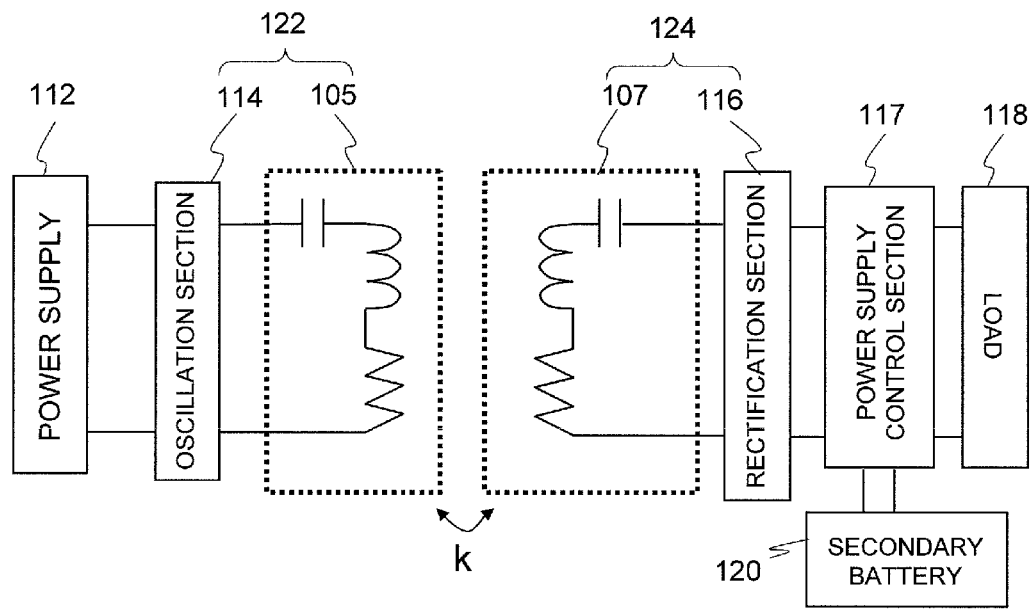
FIGS. 2A and 2B are respectively an equivalent circuit diagram and a block diagram illustrating the configuration of an electric power supply system for vehicle according to the first preferred embodiment of the present invention.

Hereinafter, elements of the electric power supply system for vehicle of this preferred embodiment will be described. FIG. 2A illustrates a part of a circuit configuration for use in the electric power supply system for vehicle of this preferred embodiment. It should be noted that the circuit configuration shown in FIG. 2A is only an example of this preferred embodiment and does not always have to be used according to the present invention. For example, if necessary, a feedback control functional block may be added to between any pair of these circuit blocks.

The electric power supply system for vehicle of this preferred embodiment includes a power transmitting section 122 that is arranged on the ground and a power receiving section 124 that is arranged in or on the vehicle 101. The power transmitting section 122 includes an oscillation section 114, which receives the energy (i.e., electric power) from a power supply 112, converts the energy into RF energy and then outputs it, and a power transmitting antenna 105, which produces a resonant magnetic field from the RF energy that has been supplied by the oscillation section 114. On the other hand, the power receiving section 124 includes a power receiving antenna 107, which is coupled to the resonant magnetic field produced by the power transmitting antenna 105 to receive the RF energy, and a rectification section 116, which converts the RF energy that has been received at the power receiving antenna 107 into DC energy and then outputs it.

The vehicle 101 further includes a power supply control section 117, a secondary battery 120 and a load 118. The secondary battery 120 is charged with, and the load 118 operates on, the DC energy that has been supplied by the rectification section 116. The power supply control section 117 controls the output of the energy from the rectification section 116 to either the load 118 or the secondary battery 120. In addition, the power supply control section 117 also controls the supply of the electric power that has been stored in the secondary battery 120 to the load 118.

Any kind of rechargeable battery may be used as the secondary battery 120. For example, a lithium ion battery or a nickel-hydrogen battery may be used. The load 118 includes an electric motor and a driver, which is connected to the electric motor, and may further include any other device to be driven with electric power. The vehicle 101 of this preferred embodiment is energized by an electric motor. However, the electric power supply system for vehicle of the present invention is also applicable for use in a vehicle to be energized by an internal combustion engine. If the electric power supply system for vehicle of the present invention is used in such a vehicle, then a gasoline engine vehicle, which turns ON its headlights with the electric power that has been received wirelessly, can be provided, for example.

As the power supply 112, either a utility power of 100 V or 200 V or a power source that is designed to supply a huge electric power may be used. It is preferred that the energy to be supplied to the oscillation section 114 on the next stage be converted into DC components. The oscillation section 114 may be either a class D, E or F amplifier that would realize a high-efficiency and low-distortion characteristic or a Doherty amplifier as well. Optionally, a high-efficiency sinusoidal wave may be generated by arranging either a low-pass filter or a band-pass filter after a switching element that generates an output signal with distortion components. The rectification section 116 may be a full-wave rectifier circuit, a bridge rectifier circuit, or a high voltage rectifier circuit, for example. Also, the rectification section 116 may be either a synchronous rectifier or a diode rectifier.

Each of the power transmitting and receiving antennas 105 and 107 includes at least an inductor circuit and a capacitor circuit. The inductor circuit of each of these antennas has either a loop shape or a spiral shape. The power transmitting and receiving antennas 105 and 107 are designed to function as a resonant circuit that produces resonances at a predetermined frequency fp. The capacitor circuit of each of these antennas may have at least a part of it implemented as either a lumped-constant circuit component such as a chip capacitor or a distributed constant circuit component to be distributed along an inductor line.

In the example illustrated in FIG. 2A, in both of the power transmitting and receiving antennas 105 and 107, an inductor circuit and a capacitor circuit are connected together in series. However, it is not always necessary to adopt this configuration. That is to say, in each of these antennas, the inductor circuit and the capacitor circuit may be connected together in series or in parallel with each other. Also, the effects of this preferred embodiment can still be achieved even if the inductor and capacitor are connected in series together in one of the two antennas and connected in parallel to each other in other antenna.

Furthermore, the power transmitting and receiving antennas 105 and 107 may be either a single wire formed by metalworking or a Litz wire consisting of multiple stranded wires in order to reduce the loss.

The power receiving antenna 107 is preferably arranged on the bottom of the vehicle 101. In that case, the power receiving antenna 107 may be either housed inside the vehicle so that its lower surface is level with the bottom of the vehicle 101 or arranged on the bottom of the vehicle so as to protrude downward from the bottom. On the other hand, the power transmitting antenna 105 may be either arranged on the ground 102 so that its surface is level with the ground 102 or embedded in the ground 102 so that its surface is deeper than the surface of the ground 102. In the latter case, the power transmitting antenna 105 may be embedded either at a constant depth under the ground 102 or at varying depths from one part of it to another.

In this preferred embodiment, the inductor circuit of the power transmitting and receiving antennas 105 and 107 is supposed to have a rectangular shape. However, the present invention is in no way limited to that specific preferred embodiment. Alternatively, those antennas may have an elliptical shape or a shape that is asymmetric with respect to the ±Y directions. Nevertheless, the electric power supply system for vehicle of the present invention is designed to operate so as to smooth out the variation in magnetic field density distribution in the X direction. That is why if the vehicle leaves only a narrow space to put the power receiving antenna 107 in, the antenna preferably has a rectangular shape to make full use of that narrow space. However, even if each antenna has a rectangular shape, that shape does not have to be rectangular in a strict sense but preferably has at least a certain degree of curvature at its corners. This is because such a steep change in wire angle would get too much current concentrated and also get the magnetic field density excessively concentrated in the surrounding space, which would not be beneficial in either case.

Next, it will be described with reference to FIG. 2B how to match impedances between these circuit blocks.

Figure 2B:
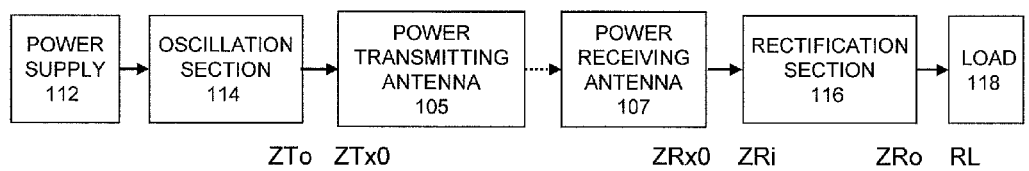

FIG. 2B is a block diagram illustrating the arrangement of functional blocks in the electric power supply system for vehicle of this preferred embodiment along with the input and output impedances of the respective circuit blocks thereof. Among the elements shown in FIG. 2A, the circuit blocks of the power supply control section 117 and the secondary battery 120 are omitted from FIG. 2B. In the following description, the input impedance of the power transmitting antenna 105 and the output impedance of the power receiving antenna 107 that would maximize the power transmission efficiency between the power transmitting and receiving antennas 105 and 107 will be referred to herein as the "best input impedance ZTx0" of the power transmitting antenna 105 and the "best output impedance ZTr0" of the power receiving antenna 107, respectively.

To suppress multiple reflection of the RF energy between the respective circuit blocks and optimize the overall power generation efficiency, it is preferred that the output impedance ZTo of the oscillation section 114 and the best input impedance ZTx0 of the power transmitting antenna 105 be matched to each other (which will be referred to herein as "Matching Condition #1"). In addition, it is also preferred that the best output impedance ZRx0 of the power receiving antenna 107 and the input impedance ZRi of the rectification section 116 be matched to each other (which will be referred to herein as "Matching Condition #2"). On top of that, it is also preferred that the output impedance ZRo of the rectification section 116 that has operated with the input impedance ZRi be matched to the load impedance RL (which will be referred to herein as "Matching Condition #3"). If all of these Matching Conditions #1, #2 and #3 are satisfied at the same time, the transmission efficiency can be maximized.

Next, it will be described how to transmit power wirelessly while the vehicle is being charged and powered.

When the power receiving antenna 107 of the moving vehicle enters the zone in which the power transmitting antenna 105 is located, electric power is ready to be transmitted from the power transmitting antenna 105 to the power receiving antenna 107. On receiving the electric power at the power receiving antenna 107, the vehicle 101 can either charge the secondary battery 120 installed in itself or power its load 118 such as a driver. By powering the load 118, the electric motor, headlights or any other device of the vehicle can be turned ON.

In this preferred embodiment, the area of the power transmitting antenna 105 is much larger than that of the power receiving antenna 107, and therefore, the coupling coefficient k between the respective inductors of the power transmitting and receiving antennas 105 and 107 is far less than one. In such a situation, it would be impossible to transmit power with high efficiency by the conventional electromagnetic induction method. According to this preferred embodiment, however, the power transmitting and receiving antennas 105 and 107 form a pair of resonators that produce resonances at substantially the same resonant frequency and are both designed to have high Q factors. For that reason, even if the coupling coefficient k between those inductors is much smaller than one, the power can still be transmitted with high efficiency according to this preferred embodiment.

Next, preferred sizes and arrangement of the power transmitting and receiving antennas 105 and 107 will be described.

Generally speaking, an electric power supply system for vehicle should maintain a stabilized transmission characteristic even without using an automated highway system (or parking system) that would assist high-precision positioning. For that purpose, it should be understood in advance how much the transmission characteristic would vary when there is a relative positional shift between the power transmitting and receiving antennas 105 and 107 and some measures to cope with such a variation should be devised beforehand. Hereinafter, it will be described what sizes and arrangement the antennas need to have in order to maintain a stabilized transmission characteristic even in cases of such a positional shift in any of the Y directions (i.e., the vehicle's traveling direction and its opposite direction) and the X directions (i.e., the vehicle's width directions).

First of all, it will be described what if there is a positional shift in any of the Y directions (which will be simply referred to herein as "the Y direction"). It is important to maintain a stabilized transmission characteristic even if there is a relative positional shift in the Y direction between the power transmitting and receiving antennas 105 and 107. This is because the running vehicle 101 is constantly moving with respect to the power transmitting antenna 105 even while being charged and powered and because the vehicle to be parked also moves back and forth when entering the parking space. To let the system have some allowance with respect to the positional shift in the Y direction, the size L1 of the power transmitting antenna 105 as measured in the Y direction is defined to be larger than the size L2 of the power receiving antenna 107 as measured in the Y direction. That is to say, the following Inequality (1) needs to be satisfied:

$$L1 > L2 \tag{1}$$

In the electric power supply system for the running vehicle, the size L1 of the power transmitting antenna 105 as measured in the Y direction is preferably defined to be larger than that of the vehicle 101 as measured in the Y direction. For example, L1 preferably falls within the range of several meters to several hundred meters in that case. By setting L1 to be much larger than L2 in this manner, stabilized charging and powering performance can be maintained for the vehicle 101 that is traveling in the Y direction over the power transmitting antenna 105.

Figure 3:
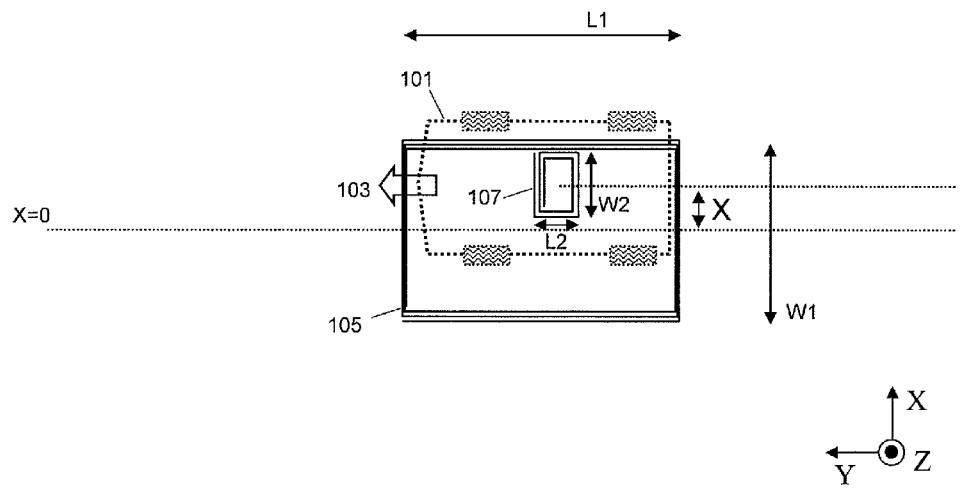
FIG. 3 is a schematic representation illustrating a perspective top view of an electric power supply system for the parked vehicle according to the first preferred embodiment of the present invention.

On the other hand, in the electric power supply system for the parked vehicle, the vehicle 101 enters its parking space while moving back or forth. To avoid obliging the driver who is going to park his or her vehicle 101 to pay too much attention to the exact location of the vehicle 101 where the power transmitting and receiving antennas 105 and 107 face each other, it is preferred that the position (its Y coordinate) at which the power receiving antenna 107 is arranged in the vehicle 101 be set in the vicinity of the center of the vehicle in the Y direction. Also, to design the vehicle with more flexibility, it is preferred that the size L1 of the power transmitting antenna 105 as measured in the Y direction be defined to be not significantly different from that of the vehicle 101 as measured in the Y direction. As used herein, if the size of one of the two is "not significantly different from" that of the other, then it means that the ratio of the size L1 of the power transmitting antenna 105 as measured in the Y direction to that of the vehicle 101 as measured in the Y direction falls within the range of 20% to 300%. FIG. 3 is a schematic representation illustrating a perspective top view of an electric power supply system for the parked vehicle that satisfies these conditions. With such an arrangement, no matter whether the power receiving antenna 107 is arranged at the bottom of the vehicle's front part or at the bottom of the vehicle's rear part, electric power can be transmitted with no problem.

Next, a positional shift in the X direction will be described. The electric power supply system for vehicle of the present invention should also maintain stabilized transmission characteristic even if there is a relative positional shift in the X direction between the power transmitting and receiving antennas 105 and 107. The reason is that the running vehicle 101 could shift in the X direction even while being charged and powered and that a vehicle that is going to be parked will usually shift in the X direction, too, whenever it enters the parking space.

To let the system have some allowance even if there is a relative positional shift in the X direction between the vehicle 101 that is either running or on the verge of being parked and the power transmitting antenna 105, the width W1 of the power transmitting antenna 105 is defined to be broader than the width W2 of the power receiving antenna 107. That is to say, the following Inequality (2) needs to be satisfied:

$$W1 > W2 \tag{2}$$

Also, it is preferred that the position (its X coordinate) at which the power receiving antenna 107 is arranged in the vehicle 101 be set in the vicinity of the center of the vehicle in the X direction.

Figure 4:
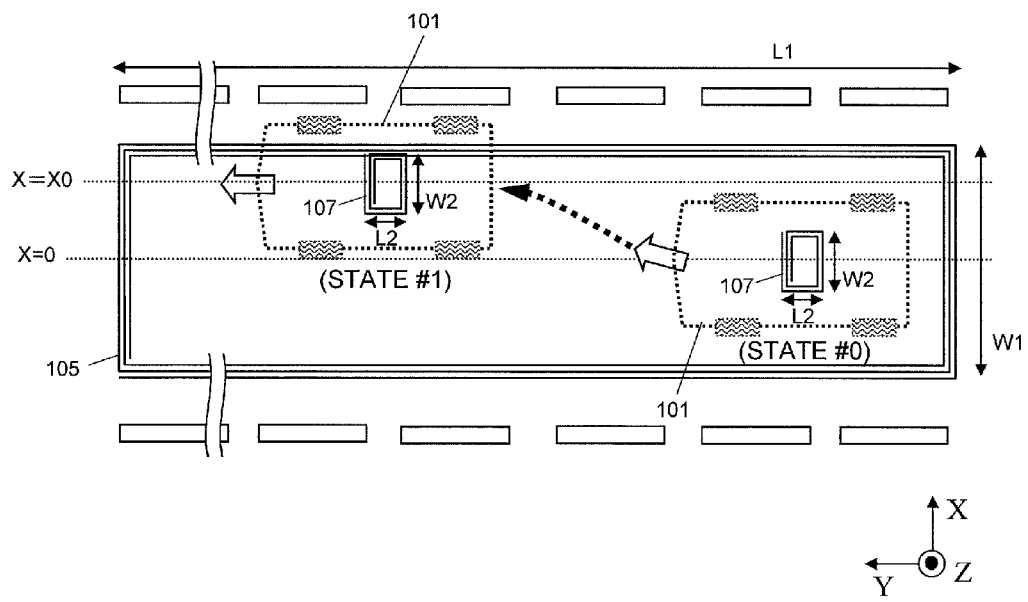
FIG. 4 is a schematic representation illustrating a perspective top view of an electric power supply system for the running vehicle according to the first preferred embodiment of the present invention.

FIG. 4 illustrates, as an example, how in the electric power supply system for the running vehicle that satisfies these conditions, the running vehicle 101 shifts in the X direction to make a transition from State #0 to State #1. In FIG. 4, in State #0, the vehicle 101 is running along the centerline of the traffic lane (i.e., when X=0). In State #1, on the other hand, the vehicle 101 is running along the end of the traffic lane on the right hand side and the entire power receiving antenna 107 barely faces the power transmitting antenna 105 (i.e., when X=X0). In that case, X0 is calculated by the following Equation (3):

$$X0 = (W1 - W2)/2 \tag{3}$$

That is why even if the vehicle moved within the range represented by the following Inequality (4), the entire power receiving antenna 107 would still face the power transmitting antenna 105, and therefore, energy could still be transmitted with high efficiency.

$$-X0 \leq X \leq 0 \tag{4}$$

However, since the spatial distribution of magnetic field densities in both of the zone surrounded with the outer periphery of the power transmitting antenna 105 and the zone outside of the power transmitting antenna 105 depends on the X coordinate, it is difficult to maintain stabilized power transmission characteristic even when the positional shift falls within the range defined by Inequality (4). That is to say, the best input impedance ZTx0 of the power transmitting antenna in State #0 is different from the best input impedance ZTx1 of the same power transmitting antenna 105 in State #1. Likewise, the best output impedance ZRx0 of the power receiving antenna 107 in State #0 is different from the best output impedance ZRx1 of the same power receiving antenna 107 in State #1.

In this case, the rate of variation FTx of ZTx1 to ZTx0 and the rate of variation FRx of ZRx1 to ZRx0 are defined by the following Equations (5) and (6), respectively:

$$FTx = ZTx1/ZTx0 \tag{5}$$

$$FRx = ZRx1/ZRx0 \tag{6}$$

For that reason, the greater the difference from one FTx and FRx represented by Equations (5) and (6) are, the less stabilized the transmission characteristic will be in cases of positional shifts in the X direction. A variation in impedance would cause reflection of energy, unwanted power loss, excessive rise in circuit temperature, and noise leakage between the oscillation section 114 and the power transmitting antenna 105 and between the power receiving antenna 107 and the rectification section 116. As a result, the voltage of the received energy could be different from the designed one. In that case, there would be no choice but to introduce some voltage control function such as a regulator or a DC-DC converter into the power supply control section in order to stabilize the voltage and the energy use efficiency would decline.

The present inventors encountered and looked into such a problem. As a result, we've come up with a condition to be satisfied to lessen the degree of instability of the power transmission characteristic that would be caused by such a problem. That condition is that the width W2 of the power receiving antenna should be greater than its own length L2 as represented by the following Inequality (7):

$$W2 > L2 \tag{7}$$

By satisfying the condition of this Inequality (7), the degree of instability of the power transmission characteristic in cases of positional shifts of the vehicle 101 in the X direction can be lessened. Specifically, when the vehicle makes a transition from State #0 to State #1 as shown in FIG. 4 while being charged and powered, the magnitude of the difference between the best input impedance of the power transmitting antenna 105 and the best output impedance of the power receiving antenna 107 can be reduced to approximately 21% or less. As a result, the variation in the voltage of the load 118 can be cut down to approximately 10% or less (see EXAMPLE 1 to be described later).

Furthermore, in the electric power supply system for the parked vehicle, the power transmitting antenna 105 is preferably designed to have a size that is approximately equal to the width of the vehicle as measured in the X direction. On the other hand, in the electric power supply system for the running vehicle, the power transmitting antenna 105 is preferably designed to have a size that is roughly equal to the width of the vehicle running area as measured in the X direction. If the width of the power transmitting antenna 105 were greater than that of the vehicle running area, multiple lanes would be covered by that power transmitting antenna alone. This is not a favorable situation because the load could vary with the number of vehicles passing per unit time.

In an electric power supply system for the running vehicle, in most cases, vehicles run approximately along the center axis of the traffic lane. For that reason, it is preferred that the power transmitting antenna 105 be arranged to have its center aligned with the center axis of the traffic lane.

By determining the sizes and arrangement of the antennas so that the conditions described above are satisfied, the electric power supply system for vehicle of this preferred embodiment can stabilize the transmission characteristic even if the vehicle 101 shifts in the X and/or Y direction(s).

Figure 5:
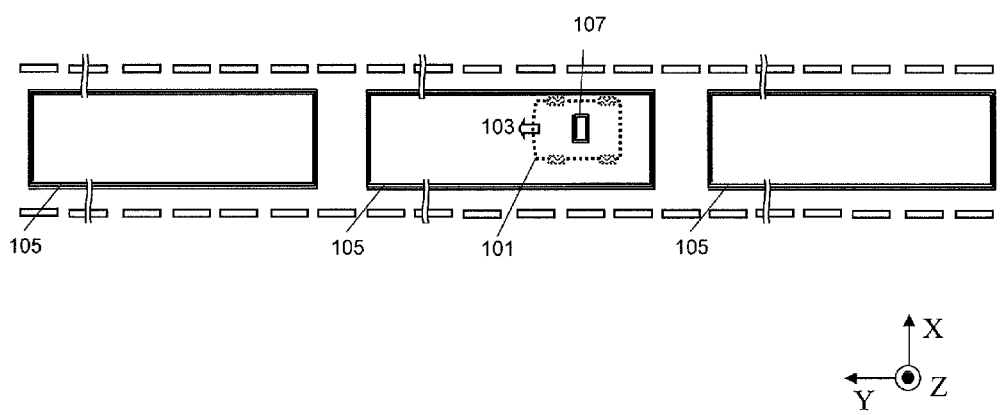
FIG. 5 is a schematic representation illustrating a top view of an alternative arrangement according to the first preferred embodiment of the present invention in which a number of power transmitting antennas are arranged in line.

The electric power supply system for vehicle of the preferred embodiment described above has only one power transmitting antenna 105. But the system may have multiple power transmitting antennas 105 as well. For example, a group of power transmitting antennas 105 may be arranged on the ground in the direction 103 in which vehicles travel. FIG. 5 is a schematic representation illustrating a perspective top view of such an arrangement. Such an arrangement can be used particularly effectively in an electric power supply system for vehicle. In that case, while running, the vehicle 101 will face one of those power transmitting antennas 105 after another, which will transmit energy to the power receiving antenna 107 in the vehicle 101 consecutively. As a result, the running vehicle 101 can be charged and powered continuously.

Next, compatibility between the electric power supply system for the running vehicle and that for the parked vehicle will be described.

The electric power supply system for vehicle of this preferred embodiment may include both a power transmitting antenna 105 for use in the electric power supply system for the running vehicle and a power transmitting antenna 105 for use in the electric power supply system for the parked vehicle. Furthermore, the power receiving section 124, including the power receiving antenna 107 and the rectification section 116 and forming part of the electric power supply system for the running vehicle, could be designed to function as the power receiving section 124 of the electric power supply system for the parked vehicle. In other words, the vehicle can be given the ability to be charged and powered by a single unit, no matter whether the vehicle is running or parked.

Figure 6:
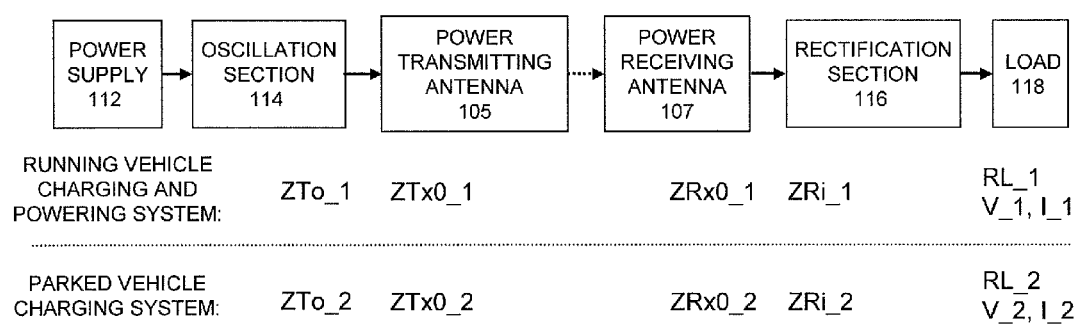
FIG. 6 is a block diagram illustrating the arrangement of the electric power supply system for vehicle as the first preferred embodiment of the present invention.

FIG. 6 shows the impedances of the respective circuit blocks of the two kinds of systems and current and voltages at their loads. Among the elements shown in FIG. 2A, the circuit blocks of the power supply control section and the secondary battery are omitted from FIG. 6. The electric power supply system for the running vehicle and that for the parked vehicle have different coupling coefficients k between their power transmitting and receiving antennas 105 and 107. That is why not every pair of parameter values shown in FIG. 6 is the same between the electric power supply system for the running vehicle and that for the parked vehicle. For example, the best output impedance ZRx0_1 of the power receiving antenna 107 of the electric power supply system for the running vehicle may be different from the best output impedance ZRx0_2 of the power receiving antenna 107 of the electric power supply system for the parked vehicle. The identifiers "_1" and "_2" indicate identity as a parameter of the electric power supply system for the running vehicle and identity as a parameter of the electric power supply system for the parked vehicle, respectively. Likewise, the best output impedances ZTo_1 and ZTo_2 of the respective oscillation sections 114, the best input impedances ZTx0_1 and ZTx0_2 of the respective power transmitting antennas 105, the best input impedances ZRi_1 and ZRi_2 of the respective rectification sections 116, and the best input impedances RL_1 and RL_2 of the respective loads 118 may have mutually different values. No matter whether the input impedance is ZRi_1 or ZRi_2, the rectification section 116 preferably operates with high efficiency.

Furthermore, the input voltages V_1 and V_2 of the respective loads 118 (such as chargers), i.e., the output voltages of the respective rectification sections 116, are preferably defined so as to fall within their permissible ranges. More preferably, V_1 and V_2 are defined to be roughly equal to each other. As used herein, if one of these two values is "roughly equal to" the other, then it means that the V_1/V_2 ratio falls within the range of 0.8 to 1.2. If this condition is satisfied, the voltage control function such as a regulator or a DC-DC converter can be used so as to operate within a desired range, and therefore, the energy use efficiency can be maintained sufficiently high. It is even more preferred that the V1/V2 ratio fall within the range of 0.9 to 1.1, in which the voltage control function described above can be eliminated by using a battery that can withstand voltage variations easily enough. Furthermore, if the V1/V2 ratio falls within the range of 0.95 to 1.05, the voltage control function described above can still be eliminated even with the use of a normal battery. And if the V1/V2 ratio falls within the range of 0.97 to 1.03, then any battery with no voltage control function can be used with a top priority given to any specific characteristic or specification (such as the capacitance or the cost) even without increasing its ability to withstand voltage variations. As a result, more beneficial effects would be achieved. Although preferred input voltage ratios have been described about a battery, the same can also be said about a load such as an engine part.

Figure 7:
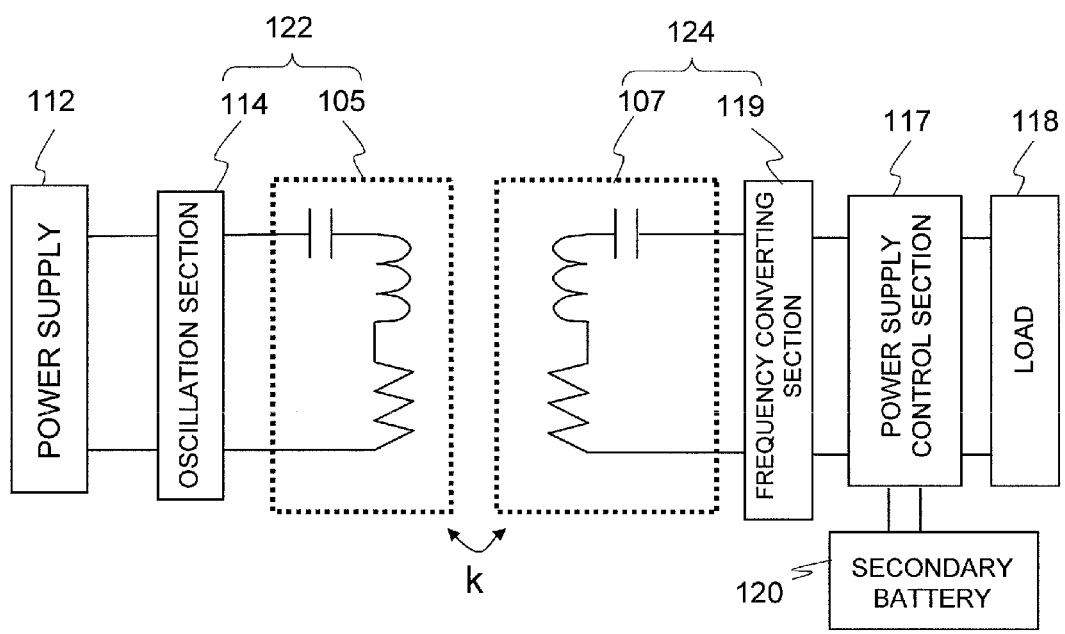
FIG. 7 is an equivalent circuit diagram illustrating the configuration of another electric power supply system for vehicle according to the first preferred embodiment of the present invention.

In this preferred embodiment, the electric motor included in the load 118 is a direct current (DC) motor, which is driven with the direct current (DC) energy supplied from the rectification section 116. However, an alternating current (AC) motor may be used instead of the DC motor. With an AC motor, one of the following two configurations may be adopted. Specifically, according to one configuration, the power supply control section 117 shown in FIG. 2A may convert DC energy into AC energy and send the AC energy to the AC motor. In such a configuration, the power supply control section 117 is designed to supply AC energy to the AC motor but supply DC energy to the secondary battery 120. According to the other configuration, a frequency converting section 119 is used instead of the rectification section 116. The frequency converting section 119 is a circuit that converts the RF energy received by the power receiving antenna 107 into alternating current (AC) energy with a lower frequency than that of the RF energy. In this configuration, the AC energy is supplied from the frequency converting section 119 to the AC motor. FIG. 7 shows an exemplary arrangement of circuit blocks according to the second configuration. In FIG. 7, the AC energy is supplied from the frequency converting section 119 to the AC motor (the load 118) via the power supply control section 117. On the other hand, in charging the secondary battery 120, the power supply control section 117 converts the AC energy into a DC energy and sends the DC energy to the secondary battery 120. If the frequency converting section 119 is used, it is preferred that the input/output impedance of the frequency converting section 119 be matched to those of the load and the other circuit blocks.

Also, even when the frequency converting section 119 is used as shown in FIG. 7, it is possible to transmit power from multiple different power transmitting antennas to the power receiving antenna 107 as in the preferred embodiments described above. The coupling coefficient between one power transmitting antenna and the power receiving antenna 107 may be different from the one between another power transmitting antenna and the power receiving antenna 107. The system is preferably designed so that the input voltage of the load 118 or that of the second battery 120 is substantially same even if the coupling coefficients are different.

Hereinafter, the advantages of this preferred embodiment over the prior art will be described.

In the electric power supply system for vehicle of this preferred embodiment, the area of the power transmitting antenna is much larger than that of the power receiving antenna. A technique for coping with a positional shift of a vehicle using such an arrangement has never been disclosed in any document in the pertinent art. Meanwhile, the electric power supply system for vehicle of this preferred embodiment can stabilize the transmission characteristic even if the vehicle shifts in the X or Y direction.

Japanese Patent Application Laid-Open Publication No. 2009-106136 discloses a technique for dealing with a positional shift of a parked vehicle in the X direction by arranging a number of antennas in the vehicle or on the ground for the parked vehicle being charged and powered. However, it is not beneficial to provide multiple antennas because it will pose an obstacle to cost reduction or downsizing. On top of that, since a switch for changing antennas needs to be newly introduced into the transmission block, there is some concern about a potential decrease in transmission efficiency due to the insertion loss of the switch. Nonetheless, Japanese Patent Application Laid-Open Publication No. 2009-106136 discloses no arrangement for avoiding such a decrease in transmission efficiency.

According to the present invention, energy can be transmitted from the power transmitting antenna to the power receiving antenna only when the power receiving antenna is located in the space over the power transmitting antenna. This is because if the coupling coefficient between the respective inductors of these two antennas decreased excessively, then high-efficiency transmission would be hard to achieve.

On the other hand, according to United States Patent Application Publication No. 2008/0265684-A1 that uses the electromagnetic induction method, an arrangement adopted to cope with a horizontal shift of a vehicle would cause a more significant decrease in efficiency. Specifically, according to the arrangement disclosed in that United States patent application publication, two antenna elements, each of which has a half as large a width as the power transmitting antenna of the present invention, are provided for the transmitter on the ground. Meanwhile, two antenna elements are also arranged side by side within a narrow width of the vehicle. With two antenna elements provided for each of the transmitting and receiving ends, there are four possible combinations. According to the technique disclosed in that United States patent application publication, high-efficiency stabilized transmission would never be realized unless strong coupling is achieved in any of those four possible combinations and unless amplitude and phase are controlled independently, no matter which of the four combinations is adopted to transmit the energy. Actually, however, in at least two of the four different types of coupling, the relative distance between the respective inductors cannot but be too long. Among other things, the greater the horizontal shift of the vehicle, the more and more difficult it is to achieve transmission efficiency that is high enough to couple every pair of antenna elements just as intended. On top of that, that United States patent application publication discloses no means for overcoming the decrease in transmission efficiency due to the insertion loss of a control element for controlling each transmission line or a switching element.

Another conventional electric power supply system for vehicle transmits energy from a power transmitting antenna to a power receiving antenna using an electromagnetic wave, which is a progressive wave (see Japanese Patent Application Laid-Open Publication No. 2002-152996). However, this conventional system operates on a totally different principle from the electric power supply system for vehicle of the present invention that uses resonant magnetic coupling. That is why even if the conventional system uses a power receiving antenna that is designed to satisfy W2>L2, the allowance cannot be increased effectively in cases of horizontal positional shifts of the vehicle, unlike a situation where the power receiving antenna of the present invention is used. Rather, an increase in the horizontal aperture width of such an antenna that radiates a progressive wave would decrease not only the half width of radiation horizontally but also the degree of allowance with respect to positional shifts. That is why the effect of the present invention is a unique one to be achieved only when the size of the power transmitting antenna is larger than that of the power receiving antenna in resonant magnetic coupling method.

Example 1

Hereinafter, specific examples of the present invention will be described.

To demonstrate the beneficial effect of the present invention, a specific example of the electric power supply system for vehicle was made to have the arrangement shown in FIGS. 1A and 1B and analyzed. In this example, the electric power supply system for vehicle satisfied W1=200 cm, L1=750 cm, and H=20 cm. The power transmitting antenna 105 and the power receiving antenna 107 were designed to have the same resonant frequency of 1 MHz. Also, the power transmitting and receiving antennas 105 and 107 were made of a Litz wire to reduce the resonator loss. On the condition that L2+W2=130 cm and W2>L2, three wireless transmitting sections with mutually different sets of L2 and W2 values (which will be referred to herein as "Examples 1a, 1b and 1c", respectively) were analyzed. For the purpose of comparison, Comparative Examples 1a, 1b and 1c, satisfying W2≦L2, were also analyzed in the same way.

With the input and output terminals of the power transmitting and power receiving antennas connected to a network analyzer and with a weak signal input, their transmission and reflection characteristics were measured to find the best impedance value that would maximize the transmission efficiency between the antennas. After the measurement was made on the vehicle that was in State #1 (in which X=X0) shown in FIG. 4, the vehicle was moved to have State #0 (in which X=0) shown in FIG. 4 and measurement was made there again. And based on the results of these two measurements, the degree of stability of the transmission characteristic in cases of horizontal positional shifts of the vehicle was estimated.

Figure 8:
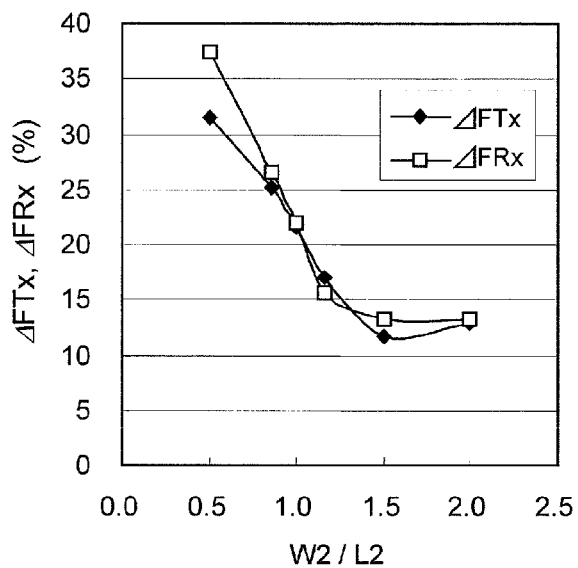
FIG. 8 is a graph showing how impedances vary in Specific Examples 1a and 1b of the present invention and in Comparative Examples 1a, 1b and 1c.

The following Table 1 and FIG. 8 summarize the impedance variations in Examples 1a, 1b and 1c and in Comparative Examples 1a, 1b and 1c. In Table 1 and FIG. 8, ΔFTx and ΔFRx represent the impedance variations of the power transmitting and receiving antennas, respectively. The closer to zero the ΔFTx and ΔFRx values are, the more stabilized the system gets in spite of positional shifts in the X direction.

TABLE 1

|  | w2 | L2 | W2/L2 | ΔFTx (%) | ΔFRx (%) |
|---|---|---|---|---|---|
| Cmp. Ex. 1a | 43 | 87 | 0.50 | 31.4 | 37.5 |
| Cmp. Ex. 1b | 60 | 70 | 0.86 | 25.1 | 26.6 |
| Cmp. Ex. 1c | 65 | 65 | 1.00 | 21.7 | 22.1 |
| Example 1a | 70 | 60 | 1.17 | 17.1 | 15.7 |
| Example 1b | 78 | 52 | 1.50 | 11.8 | 13.2 |
| Example 1c | 87 | 43 | 2.00 | 12.8 | 13.3 |

In each of these comparative examples and specific examples of the present invention, if the impedances were not completely matched to each other, the maximum transmission efficiencies were not significantly different, no matter whether the vehicle was in State #0 or State #1. Thus, using the received voltage $VRi\_0$ and FRx in State #0, the received voltage $VRi\_1$ in a situation where the power transmitted was maximized in State #1 is represented by the following Equation (8):

$$VRi\_1 = VRi\_0 \times (FRx)^{0.5} \qquad (8)$$

According to this Equation (8), if the maximum permissible variation in the voltage of the load or secondary battery is ±10%, then the maximum permissible variation in FRx will be 21%. The results shown in FIG. 8 and Table 1 prove that stabilized characteristics were achieved when W2>L2, which is the condition that should be satisfied by the electric power supply system for vehicle of the present invention, was satisfied. In addition, since the ZTx value never varies significantly, reflection of signals between the power transmitting antenna and the oscillation section can be reduced. That is why there is no need to overestimate the ability to withstand the voltage variations or specification of devices for use in the circuits that form the oscillation block. What is more, it was also discovered that only if W2/L2>1 was satisfied, stabilized performance was realized even without increasing the W2/L2 value excessively.

Figure 9:
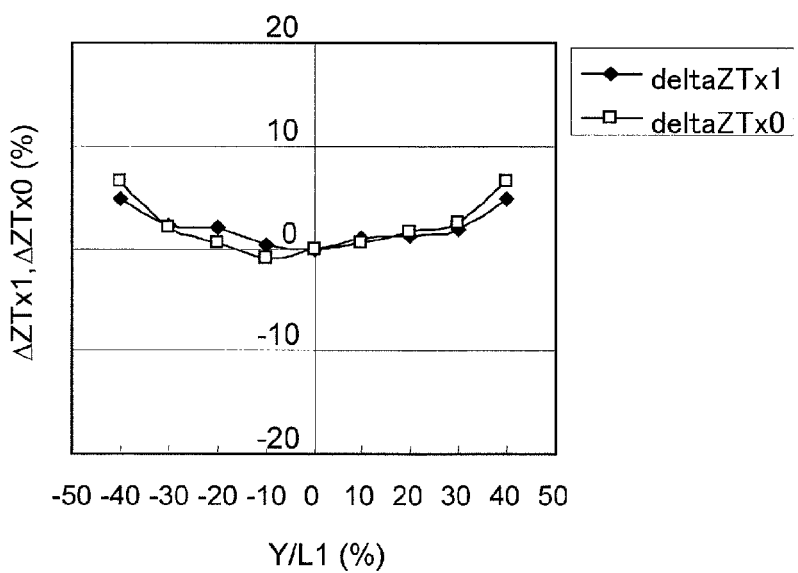
FIG. 9 is a graph showing how the best impedance of a power transmitting antenna varies in Example 1b when there is a positional shift in the Y direction while X=0 is satisfied.
Figure 10:
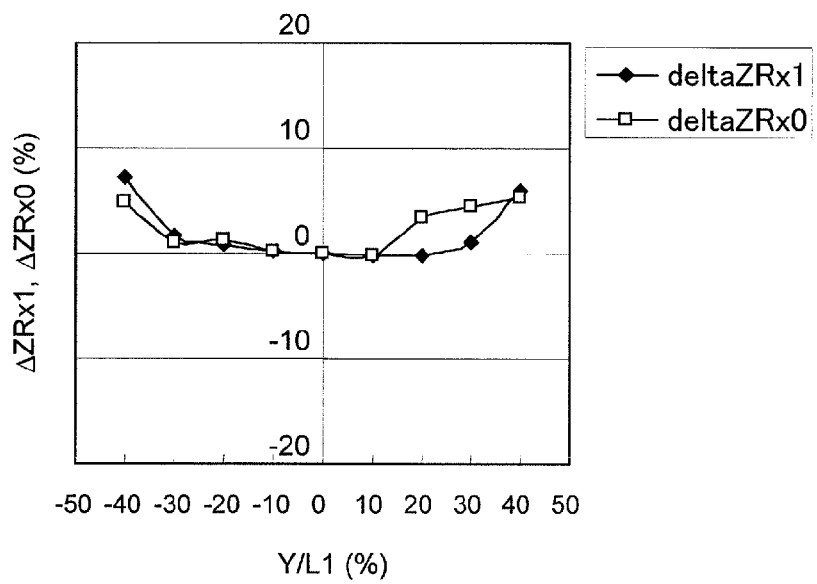
FIG. 10 is a graph showing how the best impedance of a power receiving antenna varies in Example 1b when there is a positional shift in the Y direction while X=X0 is satisfied.

Next, it will be described how the transmission characteristic varies with the magnitude of shift in the vehicle's traveling direction. In the arrangement of Example 1b, the vehicle was shifted in the Y direction with X=0 and with X=X0 kept satisfied, respectively. FIG. 9 shows the Y dependences of the impedances ZTx1 and ZTx0 in such situations. In the same way, FIG. 10 shows the Y dependences of the impedances ZRx1 and ZRx0 in such situations. In FIGS. 9 and 10, every value was normalized with the value when Y=0 supposed to be a reference value. As can be seen from FIGS. 9 and 10, the variation in impedance with the shift in the Y direction was 7.3% or less at any terminal on the transmitting or receiving end. Thus, these data demonstrated that the electric power supply system for vehicle of the first preferred embodiment of the present invention could maintain good transmission characteristic even if the vehicle shifted in its traveling direction.

Furthermore, the power supply and oscillation section were connected to the power transmitting antenna, the rectification section and the load were connected to the power receiving antenna, and the impedance matching condition was satisfied at each of those points of connection. Using such an arrangement, the secondary battery in the vehicle could be charged with the energy that had been transmitted from the power transmitting antenna.

With H changed from 10 cm into 55 cm in each of those Examples 1a, 1b and 1c and Comparative Examples 1a, 1b and 1c, the variations in impedance in the electric power supply system for vehicle were also measured. Even so, the effect of the present invention was also achieved when W2>L2 was satisfied.

And with L1 reduced to 250 cm, the variation in impedance in the electric power supply system for vehicle was also measured. Even in that case, the effect of the present invention was also achieved when W2>L2 was satisfied.

Figure 11:
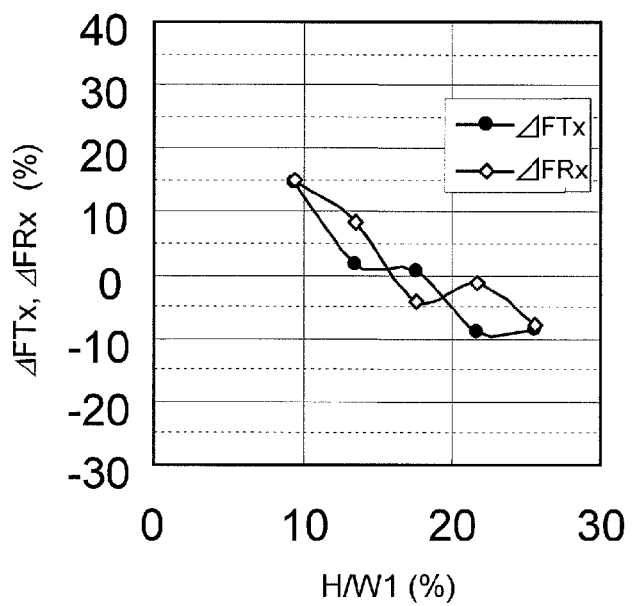
FIG. 11 is a graph showing how impedances vary with the height of the plane on which the power receiving antenna is arranged.

As described above, according to the present invention, by setting the size W2 of the power receiving antenna as measured in the X direction to be greater than its size L2 as measured in the Y direction, the vehicle can be charged and powered with stabilized transmission characteristic maintained. Optionally, by further setting the height H of the plane on which the power receiving antenna is arranged with respect to the plane on which the power transmitting antenna is arranged so that the ratio of the height H to the size W1 of the power transmitting antenna as measured in the X direction falls within an appropriate range, in addition to such a setting, the transmission characteristic can be further improved. FIG. 11 shows how much the impedance variation depended on the H/W1 ratio in each of the power transmitting and receiving antennas in a situation where W2/L2=2 was satisfied. As can be seen from FIG. 11, when the H/W1 value was set to be around 0.15, the impedance variation was minimum. Thus, it is more preferred that the H/W1 ratio have that value.

The electric power supply system for vehicle of the present invention can be used as a system for charging and powering an electric vehicle that is either running or parked. However, the present invention can be used to charge and power not only electric vehicles but also electric motorcycles, mobile robots or any other type of vehicle as well.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An electric power supply system for vehicle comprising:
    at least one power transmitting antenna, which is arranged on or under the ground, and
    a power receiving antenna, which is arranged in or on at least one vehicle,
    wherein the power transmitting and receiving antennas form a pair of resonators that couples with each other by producing resonant magnetic coupling between them, and
    wherein supposing that the direction in which the vehicle is traveling is Y direction and the direction perpendicular to the Y direction is X direction,
    the lengths of the power transmitting antenna as measured in the Y and X directions are greater than those of the power receiving antenna as measured in the Y and X directions, respectively, and the length of the power receiving antenna as measured in the X direction is greater than its length as measured in the Y direction, and the lengths of the power transmitting antenna as measured in the Y and X directions are greater than those of the vehicle as measured in the Y and X directions, respectively, and wherein power is supplied from the power transmitting antenna to the power receiving antenna by a non-contact method when the power transmitting antenna faces the power receiving antenna, and wherein while power transmission is carried out between the power transmitting antenna and the power receiving antenna, the entire power receiving antenna projected onto the plane defined by the outer periphery of the power transmitting antenna is positioned inside the outer periphery of the power transmitting antenna.

2. The electric power supply system for vehicle of claim 1, further comprising an oscillation section that converts energy received from a power supply into RF energy and then sends the RF energy to the power transmitting antenna, wherein the vehicle includes a power converting section that converts the RF energy, which has been received by the power receiving antenna from the power transmitting antenna, into DC energy or AC energy, of which the frequency is lower than that of the RF energy and then outputs the DC energy or the AC energy.

3. The electric power supply system for vehicle of claim 2, wherein the input impedance of the power transmitting antenna that maximizes transmission efficiency between the power transmitting and receiving antennas matches the output impedance of the oscillation section.

4. The electric power supply system for vehicle of claim 2, wherein the output impedance of the power receiving antenna that maximizes transmission efficiency between the power transmitting and receiving antennas matches the input impedance of the power converting section.

5. The electric power supply system for vehicle of claim 2, wherein the vehicle has a load to be energized with the DC energy or the AC energy supplied by the power converting section.

6. The electric power supply system for vehicle of claim 5, wherein the input impedance of the load matches the output impedance of the power converting section.

7. The electric power supply system for vehicle of claim 5, wherein the at least one power transmitting antenna includes a first power transmitting antenna and a second power transmitting antenna, and wherein the coupling coefficient between the first power transmitting antenna and the power receiving antenna is different from the coupling coefficient between the second power transmitting antenna and the power receiving antenna, and wherein the system is designed so that the load has substantially the same input voltage, no matter whether power transmission is carried out between the first power transmitting antenna and the power receiving antenna or between the second power transmitting antenna and the power receiving antenna.

8. The electric power supply system for vehicle of claim 1, wherein the vehicle has a secondary battery, and wherein the secondary battery is charged with the energy that the power receiving antenna has received from the power transmitting antenna.

9. The electric power supply system for vehicle of claim 1, wherein when viewed perpendicularly to the ground, the center of the power receiving antenna is located around a centerline that is defined to pass the center of the vehicle in the X direction.

10. The electric power supply system for vehicle of claim 1, wherein when viewed perpendicularly to the ground, the center of the power receiving antenna is located around a centerline that is defined to pass the center of the vehicle in the Y direction.

11. The electric power supply system for vehicle of claim 1, wherein the length of the power transmitting antenna as measured in the Y direction is substantially equal to that of the vehicle as measured in the Y direction.

12. The electric power supply system for vehicle of claim 1, wherein the length of the power transmitting antenna as measured in the Y direction is greater than that of the vehicle as measured in the Y direction.

13. The electric power supply system for vehicle of claim 1, wherein when viewed perpendicularly to the ground, the center of the power transmitting antenna is located around a centerline that is defined to pass the center of a traffic lane in the X direction.

14. The electric power supply system for vehicle of claim 1, wherein the at least one power transmitting antenna includes a plurality of power transmitting antennas that are arranged in the Y direction, and wherein when the power receiving antenna faces one of the multiple power transmitting antennas after another as the vehicle travels, power is transmitted sequentially to the power receiving antenna from that power transmitting antenna that faces the power receiving antenna.

15. A vehicle for use in an electric power supply system for vehicle, the electric power supply system comprising:

at least one power transmitting antenna, which is arranged on or under the ground, and a power receiving antenna, which is arranged in or on at least one vehicle, wherein the power transmitting and receiving antennas form a pair of resonators that couples with each other by producing resonant magnetic coupling between them, and wherein supposing that the direction in which the vehicle is traveling is Y direction and the direction perpendicular to the Y direction is X direction, the lengths of the power transmitting antenna as measured in the Y and X directions are greater than those of the power receiving antenna as measured in the Y and X directions, respectively, and the length of the power receiving antenna as measured in the X direction is greater than its length as measured in the Y direction, and the lengths of the power transmitting antenna as measured in the Y and X directions are greater than those of the vehicle as measured in the Y and X directions, respectively, and wherein power is supplied from the power transmitting antenna to the power receiving antenna by a non-contact method when the power transmitting antenna faces the power receiving antenna, and wherein while power transmission is carried out between the power transmitting antenna and the power receiving antenna, the entire power receiving antenna projected onto the plane defined by the outer periphery of the power transmitting antenna is positioned inside the outer periphery of the power transmitting antenna, the vehicle comprising:

the power receiving antenna, and a load to be energized with the energy that the power receiving antenna has received from the power transmitting antenna.

16. The vehicle of claim 15, wherein the load is an electric motor.

17. The vehicle of claim 15, wherein the vehicle is powered by an internal combustion engine.

18. A power transmitting antenna for use in an electric power supply system for vehicle, the electric power supply system comprising:
at least one power transmitting antenna, which is arranged on or under the ground, and
a power receiving antenna, which is arranged in or on at least one vehicle,
wherein the power transmitting and receiving antennas form a pair of resonators that couples with each other by producing resonant magnetic coupling between them, and
wherein supposing that the direction in which the vehicle is traveling is Y direction and the direction perpendicular to the Y direction is X direction,
the lengths of the power transmitting antenna as measured in the Y and X directions are greater than those of the power receiving antenna as measured in the Y and X directions, respectively, and
the length of the power receiving antenna as measured in the X direction is greater than its length as measured in the Y direction, and
the lengths of the power transmitting antenna as measured in the Y and X directions are greater than those of the vehicle as measured in the Y and X directions, respectively, and
wherein power is supplied from the power transmitting antenna to the power receiving antenna by a non-contact method when the power transmitting antenna faces the power receiving antenna, and
wherein while power transmission is carried out between the power transmitting antenna and the power receiving antenna, the entire power receiving antenna projected onto the plane defined by the outer periphery of the power transmitting antenna is positioned inside the outer periphery of the power transmitting antenna.

19. A power receiving system comprising:
a power receiving antenna for use in an electric power supply system for vehicle; and
a power converting section for converting RF energy that the power receiving antenna has received from the power transmitting antenna into DC energy or AC energy, of which the frequency is lower than that of the RF energy, and outputting the DC energy or the AC energy,
wherein the electric power supply system comprises:
at least one power transmitting antenna, which is arranged on or under the ground, and
a power receiving antenna, which is arranged in or on at least one vehicle,
wherein the power transmitting and receiving antennas form a pair of resonators that couples with each other by producing resonant magnetic coupling between them, and
wherein supposing that the direction in which the vehicle is traveling is Y direction and the direction perpendicular to the Y direction is X direction,
the lengths of the power transmitting antenna as measured in the Y and X directions are greater than those of the power receiving antenna as measured in the Y and X directions, respectively,
the length of the power receiving antenna as measured in the X direction is greater than its length as measured in the Y direction, and
the lengths of the power transmitting antenna as measured in the Y and X directions are greater than those of the vehicle as measured in the Y and X directions, respectively, and
wherein power is supplied from the power transmitting antenna to the power receiving antenna by a non-contact method when the power transmitting antenna faces the power receiving antenna, and
wherein while power transmission is carried out between the power transmitting antenna and the power receiving antenna, the entire power receiving antenna projected onto the plane defined by the outer periphery of the power transmitting antenna is positioned inside the outer periphery of the power transmitting antenna.

* * * * *